US 12,062,376 B2

United States Patent
Shrestha et al.

(10) Patent No.: US 12,062,376 B2
(45) Date of Patent: Aug. 13, 2024

(54) SYSTEM FOR ENTERPRISE VOICE SIGNATURE LOGIN

(71) Applicant: Dell Products L.P., Round Rock, TX (US)

(72) Inventors: Saurav Shrestha, Round Rock, TX (US); Carlin Mendonca, Austin, TX (US); Margaret Patton, Austin, TX (US); Jeffrey M. Lairsey, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 147 days.

(21) Appl. No.: 17/243,150

(22) Filed: Apr. 28, 2021

(65) Prior Publication Data
US 2022/0351734 A1    Nov. 3, 2022

(51) Int. Cl.
*G10L 17/24*   (2013.01)
*G06F 21/32*   (2013.01)
*G10L 17/04*   (2013.01)
*G10L 17/06*   (2013.01)

(52) U.S. Cl.
CPC .............. *G10L 17/24* (2013.01); *G06F 21/32* (2013.01); *G10L 17/04* (2013.01); *G10L 17/06* (2013.01)

(58) Field of Classification Search
CPC ......... G10L 17/24; G10L 17/04; G10L 17/06; G06F 21/32; H04W 12/06
See application file for complete search history.

(56) References Cited

U.S. PATENT DOCUMENTS

| | | |
|---|---|---|
| 7,310,671 B1 | 12/2007 | Hassell et al. |
| 9,148,349 B1 | 9/2015 | Burr et al. |
| 9,471,594 B1 | 10/2016 | Schnegelberger |
| 9,785,497 B1 | 10/2017 | Cook et al. |
| 10,530,935 B1 | 1/2020 | Britt et al. |
| 10,616,072 B1 | 4/2020 | Lo et al. |
| 10,715,522 B2 * | 7/2020 | Lew ................. G06F 21/32 |

(Continued)

OTHER PUBLICATIONS

Daniel Mcduff et al., Affdex SDK: A Cross-Platform Real-Time Multi-Face Expression Recognition Toolkit, Publication: CHI EA '16: Proceedings of the 2016 CHI Conference Extended Abstracts on Human Factors in Computing Systems, pp. 3723-3726, May 2016, https://doi.org/10.1145/2851581.2890247.

(Continued)

*Primary Examiner* — Richemond Dorvil
*Assistant Examiner* — Nadira Sultana
(74) *Attorney, Agent, or Firm* — Terrile, Cannatti & Chambers, LLP; Stephen A. Terrile

(57) ABSTRACT

A system, method, and computer-readable medium for performing a data center monitoring and management operation. The data center monitoring and management operation includes: selecting a reference phrase; presenting the reference phrase to a user; generating a voice signature for the reference phrase when the reference phrase is vocalized by the user; storing the voice signature for reference phrase within a data center monitoring and management console; instructing the user to recite a subset of words from the reference phrase; and, granting access to the data center monitoring and management console when the subset of words match respective voice signatures stored within the data center monitoring and management console.

20 Claims, 7 Drawing Sheets

(56) References Cited

U.S. PATENT DOCUMENTS

| | | | |
|---|---|---|---|
| 10,819,556 B1* | 10/2020 | Rangasamy | H04L 41/026 |
| 11,074,730 B1 | 7/2021 | Nunez | |
| 2006/0010497 A1 | 1/2006 | O'Brien | |
| 2006/0129670 A1 | 6/2006 | Mayer | |
| 2010/0313145 A1* | 12/2010 | Dillenberger | G06Q 10/06 |
| | | | 709/204 |
| 2011/0160987 A1 | 6/2011 | Wu et al. | |
| 2011/0258143 A1 | 10/2011 | Hilkemeyer et al. | |
| 2012/0249588 A1 | 10/2012 | Tison et al. | |
| 2013/0031202 A1 | 1/2013 | Mick et al. | |
| 2013/0346786 A1 | 12/2013 | Thiel et al. | |
| 2014/0006762 A1 | 1/2014 | Bittner et al. | |
| 2015/0019705 A1 | 1/2015 | Suryanarayanan et al. | |
| 2015/0032887 A1 | 1/2015 | Pesek et al. | |
| 2015/0095988 A1 | 4/2015 | Hirakata et al. | |
| 2017/0034200 A1 | 2/2017 | Costin et al. | |
| 2017/0091607 A1 | 3/2017 | Emeis et al. | |
| 2017/0098087 A1 | 4/2017 | Li | |
| 2017/0269617 A1 | 9/2017 | Daoud et al. | |
| 2017/0269983 A1 | 9/2017 | Liu et al. | |
| 2017/0299633 A1 | 10/2017 | Pietrowicz et al. | |
| 2017/0330096 A1 | 11/2017 | Das Gupta et al. | |
| 2018/0007060 A1* | 1/2018 | Leblang | H04L 63/107 |
| 2018/0032736 A1 | 2/2018 | Inagaki et al. | |
| 2018/0108022 A1 | 4/2018 | Bandera et al. | |
| 2018/0285750 A1 | 10/2018 | Purushothaman et al. | |
| 2018/0337907 A1* | 11/2018 | Bhansali | H04L 9/3231 |
| 2019/0035407 A1* | 1/2019 | Keret | G10L 17/24 |
| 2019/0073276 A1 | 3/2019 | Yuen et al. | |
| 2019/0158366 A1 | 5/2019 | Higgins et al. | |
| 2019/0213306 A1* | 7/2019 | Caselles | G06F 21/32 |
| 2019/0236844 A1 | 8/2019 | Balasian et al. | |
| 2019/0394206 A1 | 12/2019 | Zezza | |
| 2020/0026871 A1* | 1/2020 | Mikhailov | G06F 16/258 |
| 2020/0050861 A1 | 2/2020 | Wexler et al. | |
| 2020/0117529 A1 | 4/2020 | Qiao et al. | |
| 2020/0117898 A1 | 4/2020 | Tian et al. | |
| 2020/0167712 A1 | 5/2020 | Stracquatanio et al. | |
| 2020/0169509 A1 | 5/2020 | Tigli | |
| 2020/0175165 A1 | 6/2020 | Murphy et al. | |
| 2020/0250430 A1 | 8/2020 | Kishore et al. | |
| 2020/0250863 A1 | 8/2020 | Shetty et al. | |
| 2020/0252276 A1 | 8/2020 | Lairsey et al. | |
| 2020/0253079 A1 | 8/2020 | Lairsey et al. | |
| 2020/0278901 A1 | 9/2020 | Singh et al. | |
| 2020/0329214 A1 | 10/2020 | Ahn et al. | |
| 2020/0366671 A1* | 11/2020 | Larson | G06F 9/451 |
| 2021/0019423 A1 | 1/2021 | DuBois et al. | |
| 2021/0084119 A1 | 3/2021 | Sheikh | |
| 2021/0097058 A1 | 4/2021 | Skiles et al. | |
| 2021/0112145 A1* | 4/2021 | Monga | G06F 18/25 |
| 2021/0397182 A1 | 12/2021 | Dundorf et al. | |
| 2022/0070050 A1 | 3/2022 | D'Ippolito et al. | |
| 2022/0156162 A1 | 5/2022 | Reyes et al. | |
| 2022/0172729 A1* | 6/2022 | Mohajer | G06F 16/25 |
| 2022/0199093 A1* | 6/2022 | Ramadas | G06F 21/6254 |

OTHER PUBLICATIONS

Brittany Herr et al., Analyzing distributed trace data, Pinterest Engineering Blog, Sep. 29, 2017, https://medium.com/pinterest-engineering/analyzing-distributed-trace-data-6aae58919949.

Pedro Cesar Tebaldi, What IT Infrastructure Remote Monitoring (NOC) is, OPSERVICES (Year: 2017).

* cited by examiner

SYSTEM FOR ENTERPRISE VOICE SIGNATURE LOGIN

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: selecting a reference phrase; presenting the reference phrase to a user; generating a voice signature the reference phrase when the reference phrase is vocalized by the user; storing the voice signature for reference phrase within a data center monitoring and management console; instructing the user to recite a subset of words from the reference phrase; and, granting access to the data center monitoring and management console when the subset of words match respective voice signatures stored within the data center monitoring and management console.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: selecting a reference phrase; presenting the reference phrase to a user; generating a voice signature the reference phrase when the reference phrase is vocalized by the user; storing the voice signature for reference phrase within a data center monitoring and management console; instructing the user to recite a subset of words from the reference phrase; and, granting access to the data center monitoring and management console when the subset of words match respective voice signatures stored within the data center monitoring and management console.

In another embodiment the invention relates to a computer-readable storage medium embodying computer program code, the computer program code comprising computer executable instructions configured for: selecting a reference phrase; presenting the reference phrase to a user; generating a voice signature the reference phrase when the reference phrase is vocalized by the user; storing the voice signature for reference phrase within a data center monitoring and management console; instructing the user to recite a subset of words from the reference phrase; and, granting access to the data center monitoring and management console when the subset of words match respective voice signatures stored within the data center monitoring and management console.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
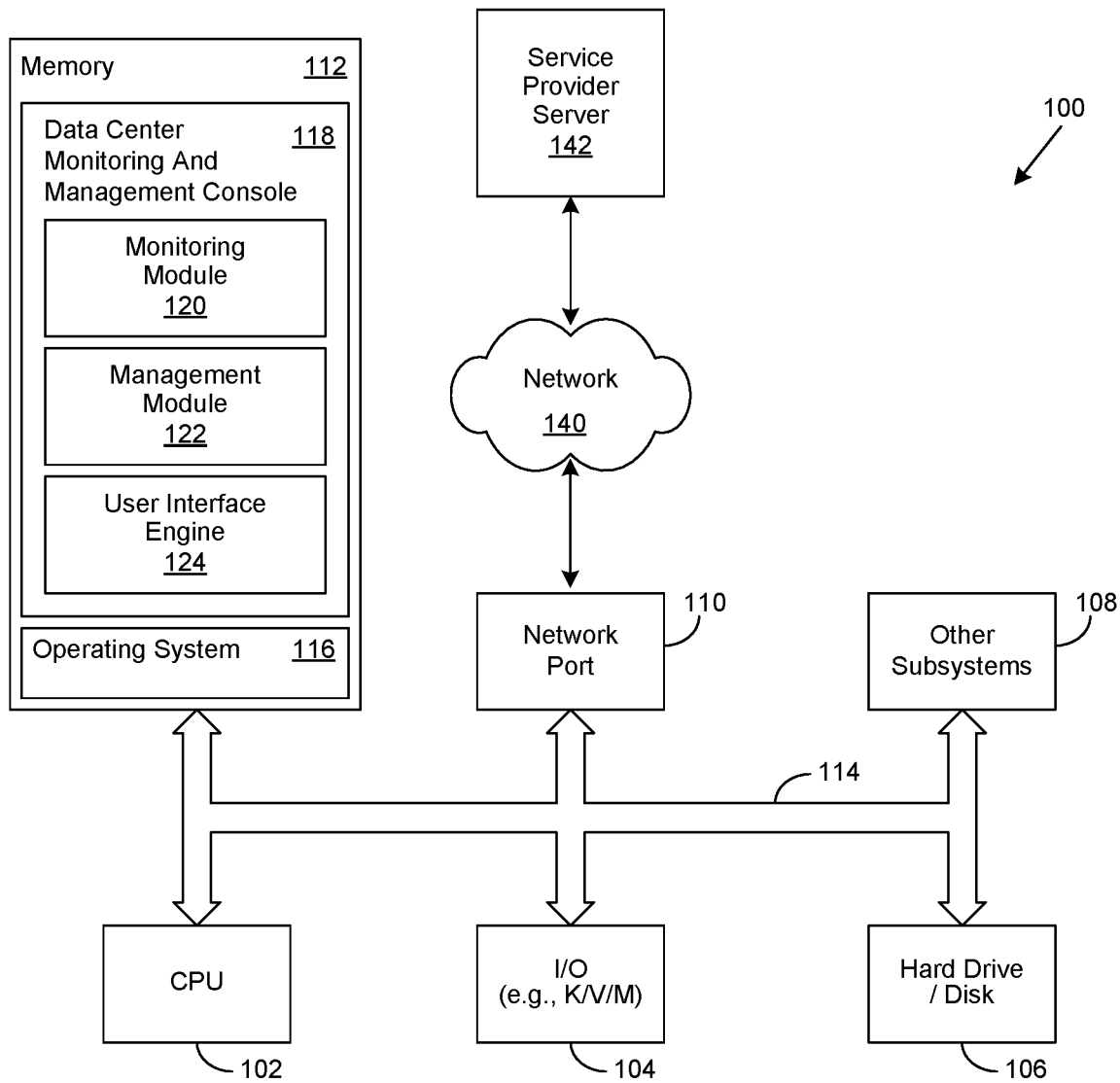
FIG. 1 shows a general illustration of components of an information handling system as implemented in the system and method of the present invention.

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads. Accordingly, various aspects of the invention reflect an appreciation that efficient and effective monitoring and management of certain data center assets may assist in optimizing the availability, performance, and reliability of the services offered by a data center.

Various aspects of the invention reflect an appreciation that data center system administrators, beyond their day-to-day monitoring and management duties, often have the additional responsibility of remediating certain data center issues. Certain aspects of the invention likewise reflect an appreciation that the complexity of such remediation responsibilities generally grows in proportion to the number of data center assets that are being monitored and managed. Likewise, certain aspects of the invention reflect an appreciation that quickly remediating data center issues, regardless of how simple or complex they may be, will likely lead to higher quality of service levels and user satisfaction.

Certain aspects of the invention reflect an appreciation that maintaining security is an ongoing concern within many data centers. In particular, maintaining secure access to data center management systems is of particular interest, as unauthorized access could lead to a security breach. Various aspects of the invention reflect an appreciation that certain known approaches to securing a data center management systems includes the incorporation of multi-factor authentication. In general, multi-factor authentication typically refers to authentication approaches that use something the user knows (e.g., a User ID and password), something the user has (e.g., a security token or dongle), or something the user is (e.g., biometrics, such as a fingerprint or retinal scan). However, certain aspects of the invention likewise reflect an appreciation that while multi-factor authentication approaches for something the user knows, or has, is relatively easy to implement, the use of biometrics may prove more challenging. Furthermore, the use of biometrics, such as a fingerprint or retinal scan, for authentication may prove to be inconvenient, as it may interrupt the user's workflow.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, and a user interface engine 124, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein.

Figure 2:
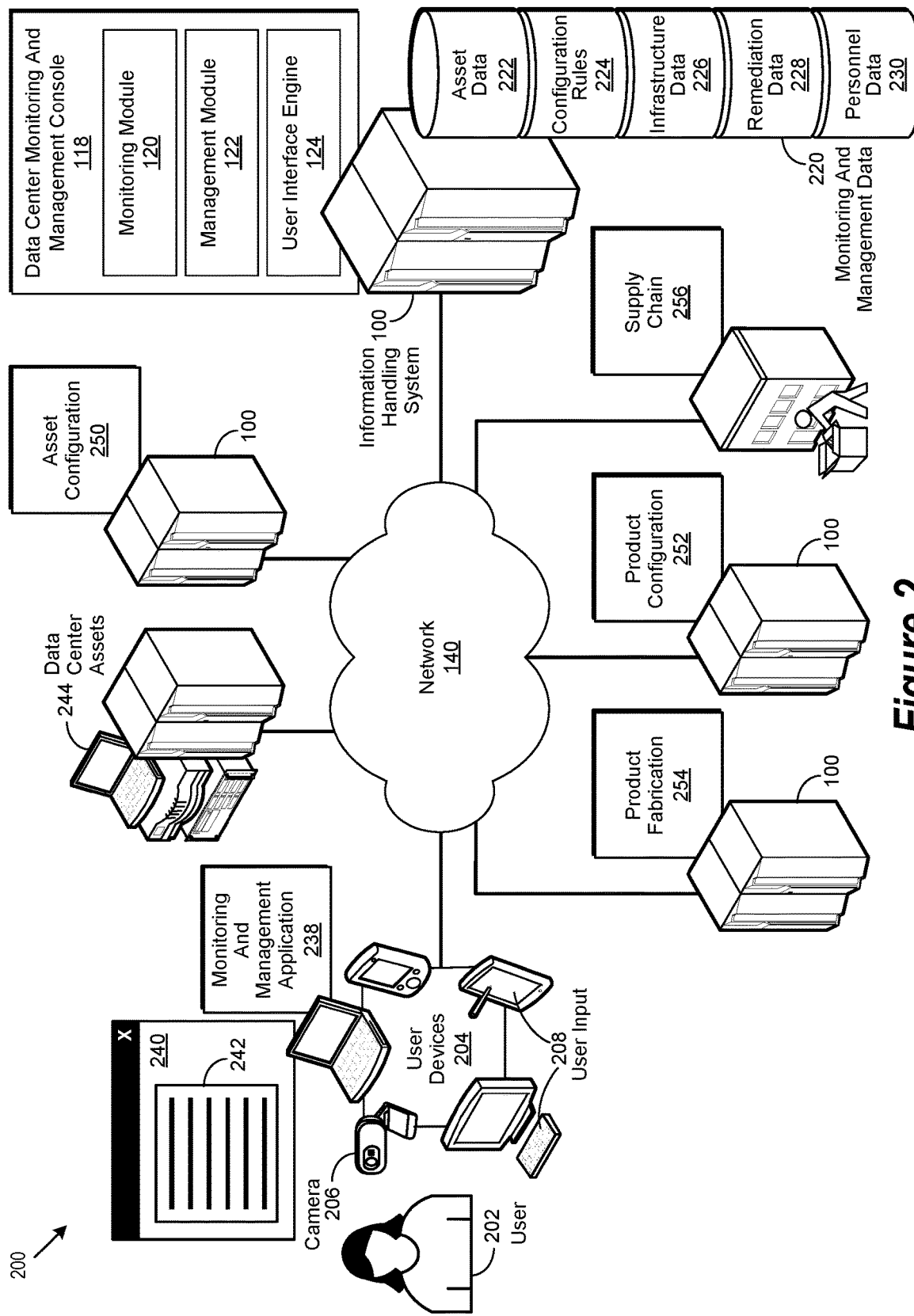
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software, firmware, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the selection of such parameters is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

In certain embodiments, the data center monitoring and management console 118 may be implemented to receive an alert corresponding to a particular data center issue. In various embodiments, the data center monitoring and management console 118 may be implemented to receive certain information associated with the operation of a particular data center asset 244. In certain embodiments, such operational information may be received through the use of telemetry approaches familiar to those of skill in the art. In various embodiments, the data center monitoring console 118 may be implemented to process certain operational information received from a particular data center asset to determine whether a data center issue has occurred, is occurring, or is anticipated to occur.

In certain embodiments, the data center monitoring and management console 118 may be implemented to include a monitoring module 120, a management monitor 122, and a user interface (UI) engine 124, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle. In various embodiments, the UI engine 124 may be implemented to generate a UI for the provision, or receipt, of certain information associated with the monitoring, or management, of a particular data center asset 244.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 222, data center asset configuration rules 224, data center infrastructure data 226, data center remediation data 228, and data center personnel data 230.

As used herein, data center asset data 222 broadly refers to information associated with a particular data center asset 244, such as an information handling system 100, which can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload. In certain embodiments, the data center asset data 224 may include information associated with data center asset 244 types, quantities, locations, use types, optimization types, workloads, performance, support information, and cost factors, or a combination thereof, as described in greater detail herein. In certain embodiments, the data center asset data 224 may include information associated with data center asset 244 utilization patterns, likewise described in greater detail herein.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. Those of skill in the art will recognize that many such examples of data center remediation data 230 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface.

In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118. In certain embodiments, the UI engine 124 may be implemented to generate the data center monitoring and management console UI 240, or the graphical representation 242 presented therein, or both.

In certain embodiments, a data center monitoring and management application 238 may be implemented on a particular user device 204. In various embodiments, the data center monitoring and management application 238 may be implemented on a mobile user device 204. such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
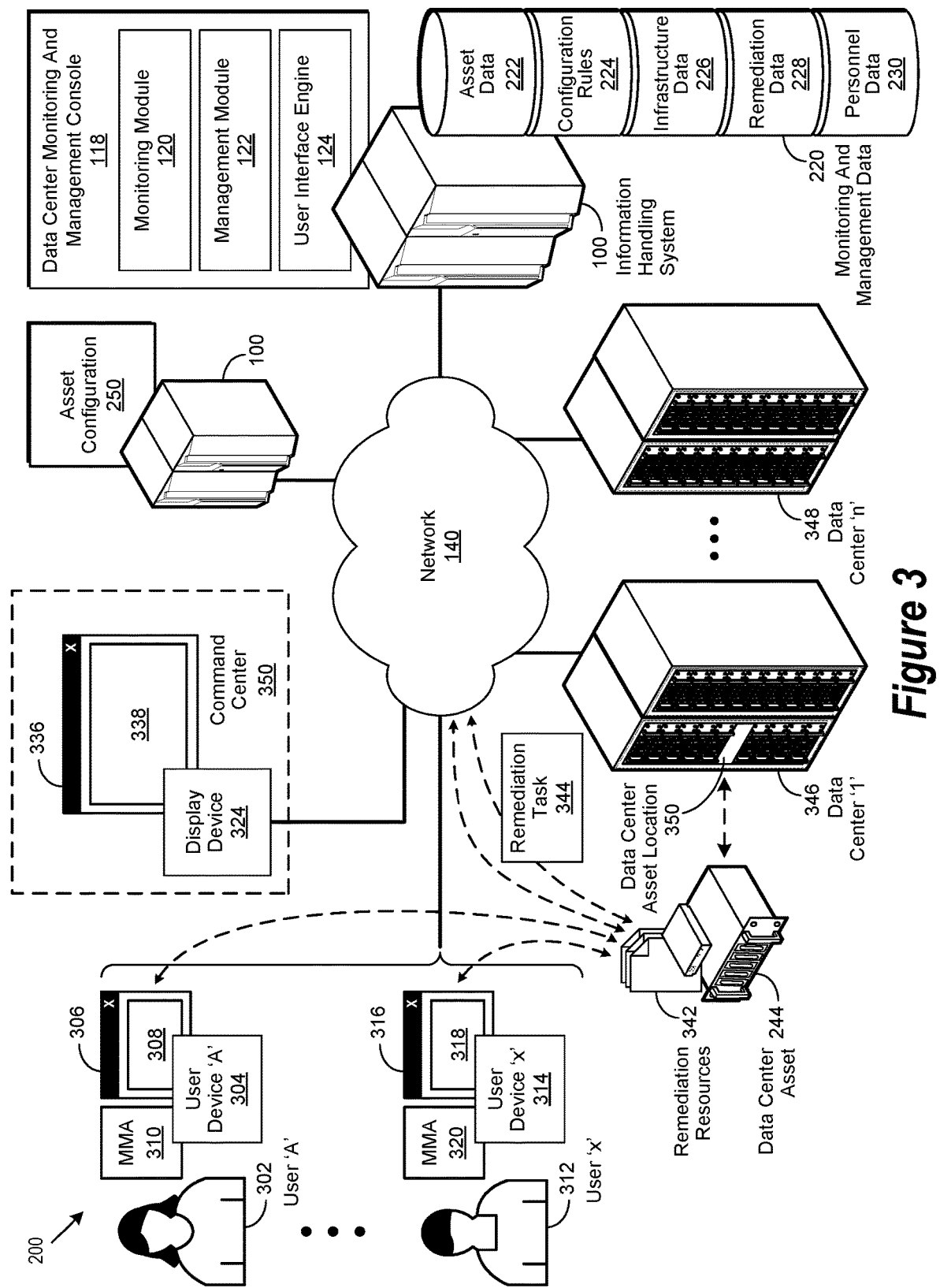
FIG. 3 shows a functional block diagram of the performance of a data center monitoring and management operation.

FIG. 3 shows a functional block diagram of the performance of a data center monitoring and management operation implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein. In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, and a user interface (UI) engine 124, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application 310 through 320, described in greater detail herein, may be respectively implemented on user devices 'A' 304 through 'x' 314. In certain embodiments the UI window 306 through 316 may be respectively implemented as a UI window of the data center monitoring and management application 310 through 320. In certain embodiments, the data center monitoring and management application 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the display device 324 may be implemented in a command center 350, familiar to those of skill in the art, such as a command center 350 typically found in a data center or a network operations center (NOC). In various embodiments, one or more or the users 'A' 302 through 'x' 312 may be located within the command center 350. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244 in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

Figure 4:
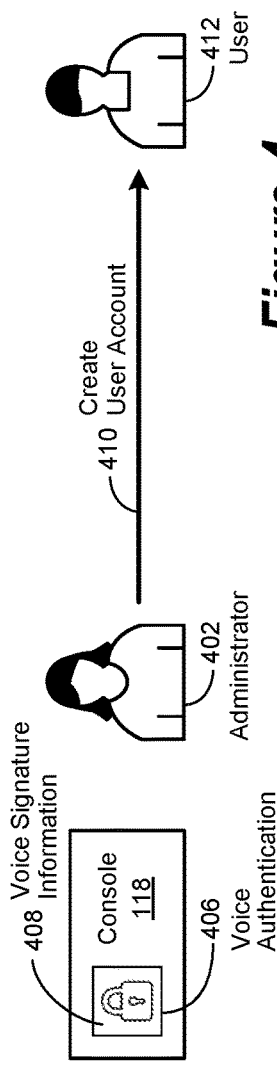
FIG. 4 is a simplified process flow diagram showing the creation of a user account by an administrator.

FIG. 4 is a simplified process flow diagram showing the creation of a user account implemented in accordance with an embodiment of the invention by an administrator. In certain embodiments, a data center administrator 402 may use a data center monitoring and management console 118, described in greater detail herein, to create 410 a user account for a target user 412. In certain embodiments, the administrator may create the data center monitoring and management console 118 account with a temporary user identifier (User ID) and password. In certain embodiments, the data center monitoring and management console 118 may be implemented to include a voice authentication module 406. In various embodiments, the voice authentication module 406 may be implemented to use certain voice signature information 408, likewise described in greater detail herein, to authenticate the user's 412 voice login to the data center monitoring and management console 118.

As used herein, a voice signature broadly refers to a unique, digital recording of a user's 412 verbalization of one or more individual words, a phrase, or a combination thereof, that can be used as a reference to authenticate the identity of the user 412 using a voice login, described in greater detail herein, to log in to a system. In certain embodiments, one or more voice signatures may be cross-referenced to a unique key associated with a corresponding user 412. In certain embodiments, a voice signature may be processed to create a unique voice-print, which is comparable to a human fingerprint or retina, as no two human voices are the same. For instance, each human voice has a unique combination of tone, pitch, range, inflection, cadence, rhythm, resonance, and so forth.

In certain embodiments, a voice signature may be used in its originally-recorded form. In certain embodiments, a voice signature may be processed with a unique key associated with its corresponding user 412 to generate an encrypted voice signature. In certain embodiments, a voice signature may be generated for each word in a particular phrase.

In certain embodiments, the individual voice signatures associated with each word in a phrase may be processed to generate a compound voice signature for the phrase. In various embodiments, such a compound voice signature may or may not be processed to generate an encrypted compound phrase. In certain embodiments, a voice signature may be generated for an entire phrase. Those of skill in the art will recognize that many such embodiments are possible. Accordingly, the foregoing is not intended to limit the spirit, scope, or intent of the invention.

As likewise used herein, a voice login broadly refers to the use of certain audible login credentials consisting of one or more individual words, a phrase, or a combination thereof, verbalized by a user to gain access to a secured system. In certain embodiments, a user's 412 voice login credentials may be authenticated through the use of certain voice recognition approaches. Those of skill in the art will be familiar with the concept of voice recognition, also commonly referred to as speaker identification, which generally refers to various known approaches for ascertaining the identity of the speaker, as opposed to speech recognition, which is oriented to understanding what the speaker is saying.

In certain embodiments, the authentication of a user's voice login credentials may be performed to verify the identity of a speaker as part of a security process. In certain embodiments, the voice signature information may be stored in a secure repository of user information. In certain embodiments, the secure repository of user information may be implemented as a repository of data center personnel data, described in greater detail herein.

Figure 5:
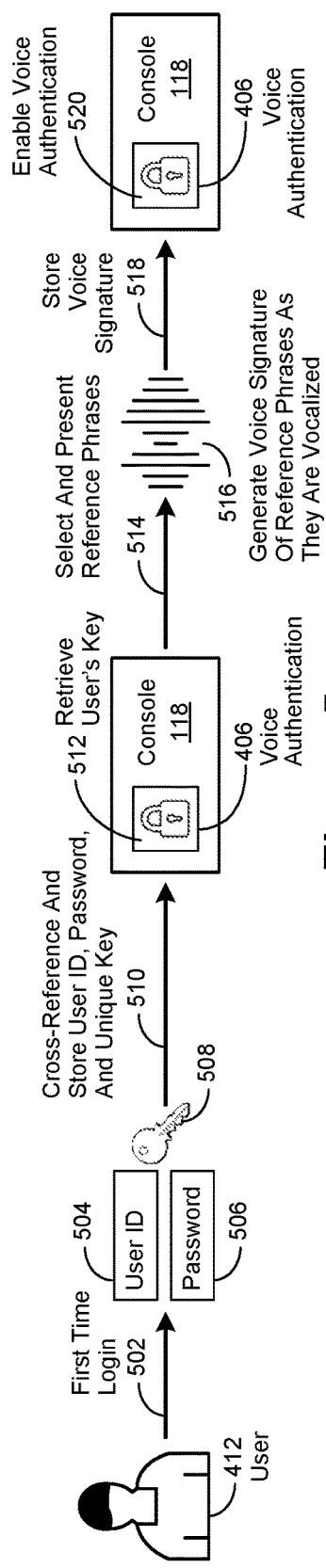
FIG. 5 is a simplified process flow diagram showing the generation of reference phrases used to generate a voice signature for an associated user.

FIG. 5 is a simplified process flow diagram showing the generation of reference phrases used to generate a voice signature implemented in accordance with an embodiment of the invention for an associated user. In certain embodiments, a target user 412 may be offered the option to use a voice login to log into a data center monitoring and management console, described in greater detail herein. In certain embodiments, the target user 412 may be offered the option of using a voice login instead of their User ID 504 and password 506 to log into a data center monitoring and management console. In certain embodiments, the target user 412 may be offered the option of using their voice login in addition to their User ID 504 and password 506 to log into a data center monitoring and management console.

In this embodiment, a target user 412 uses a temporary user identifier (User ID) and password created by a data center administrator to log in to their data center monitoring and management console 118 account for the first time, after which they are prompted to enter their preferred User ID 504 and a new password 506. The User ID 504 and password 506 provided by the user 412 is then processed to generate a unique key 508 for the user 412. The resulting unique key 508, the user's User ID 504, and their password 506, are then cross-referenced to one another and stored 510 in a secure repository, described in greater detail herein.

In various embodiments, the user's 412 unique key 508 is then retrieved and certain reference words, or phrases, or a combination thereof, are then selected and presented 514 to the user to vocalize. In these embodiments, the method by which the reference words, or phrases, or a combination thereof, are selected, and the method by which they are presented 514 to the user 412 to vocalize, is a matter of design choice. As an example, a series of individual words, such as the Military Phonetic Alphabet (e.g., "alpha," "baker," "charlie," and so forth to "zulu") may be selected for presentation to the user 412. As another example, a phrase, such as "these are the times that try men's souls," or "I took the road less traveled," or "all for one and one for all," and so forth, may be selected for presentation to the user 412. As yet another example, a phrase may be combined with one or more individual words, such as "I took the road less traveled with Charlie company," may be generated and selected for presentation to the user 412.

In certain embodiments, the selected words, or phrases, or a combination thereof, may be presented 514 to the user 412 in textual form, or audible form, or a combination thereof. As an example, the selected words, or phrases, or a combination thereof, may be presented 514 to the user 412 in textual form for the user 412 to vocalize. As another example, speech synthesis approaches familiar to skilled practitioners of the art may be used to present the selected words, or phrases, or a combination thereof, in an audible form to the user 412. Those of skill in the art will recognize that many such embodiments and examples are possible. Accordingly, the foregoing is not intended to limit the spirit, scope, or intent of the invention.

The user's unique key 508 is then used to generate 516 a voice signature of the selected reference word, or phrase, or a combination thereof as it is vocalized by the user 412. The resulting voice signature is then stored 518 in a secure repository. thereafter, voice login authentication is enabled 520.

Figure 6:
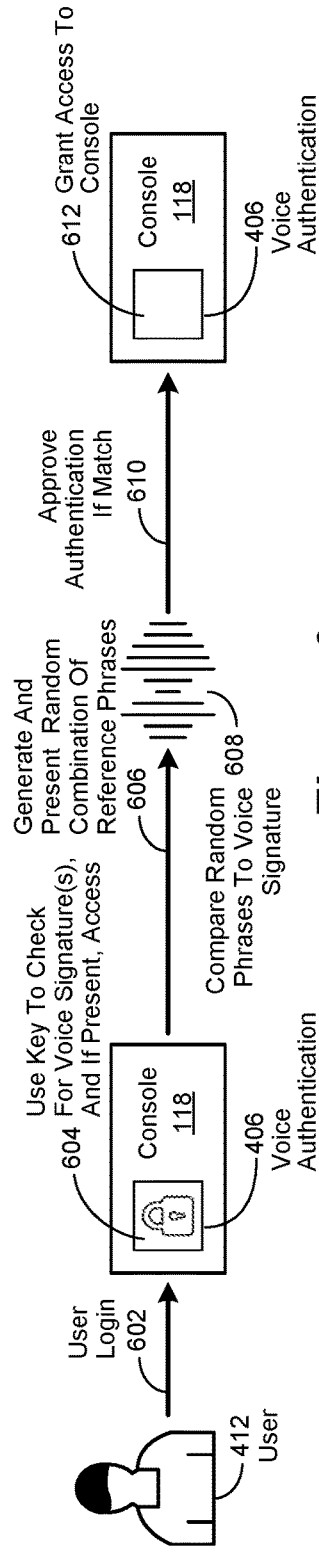
FIG. 6 is a simplified process flow diagram showing the use of a voice signature to authenticate the voice login of a user.

FIG. 6 is a simplified process flow diagram showing the use of a voice signature implemented in accordance with an embodiment of the invention to authenticate the voice login of a user. In this embodiment, a user 412 uses their user identifier (User ID) and password to log in 602 to their data center monitoring and management console 118 account. The User ID and password entered by the user 412 is then used 604 to look up the user's unique key, which once found, is then used to access the user's associated reference words, phrases, or a combination thereof, and their corresponding voice signature(s), described in greater detail herein.

Once they are identified, a random combination of the user's associated reference words, phrases, or a combination thereof, are generated and then presented 606 to the user 412. For example, the individual words "charlie," "baker," "zulu," "india," "hotel, "echo" may be presented 606 to the user 412, The random combination of reference words, phrases, or a combination thereof, is then recited by the user 412 and their vocalization in captured.

The user's 412 unique key is then used to retrieve the user's voice signature(s) corresponding the random combination of recited words, phrases, or combination thereof, from a secure repository, described in greater detail herein. The user's recitation of the random combination of reference words, phrases, or combination thereof, is then compared 608 to their corresponding voice signature(s) to determine if they match. If they do, then the user 412 is approved 610 to access 612 the data center monitoring and management console 118.

Figure 7:
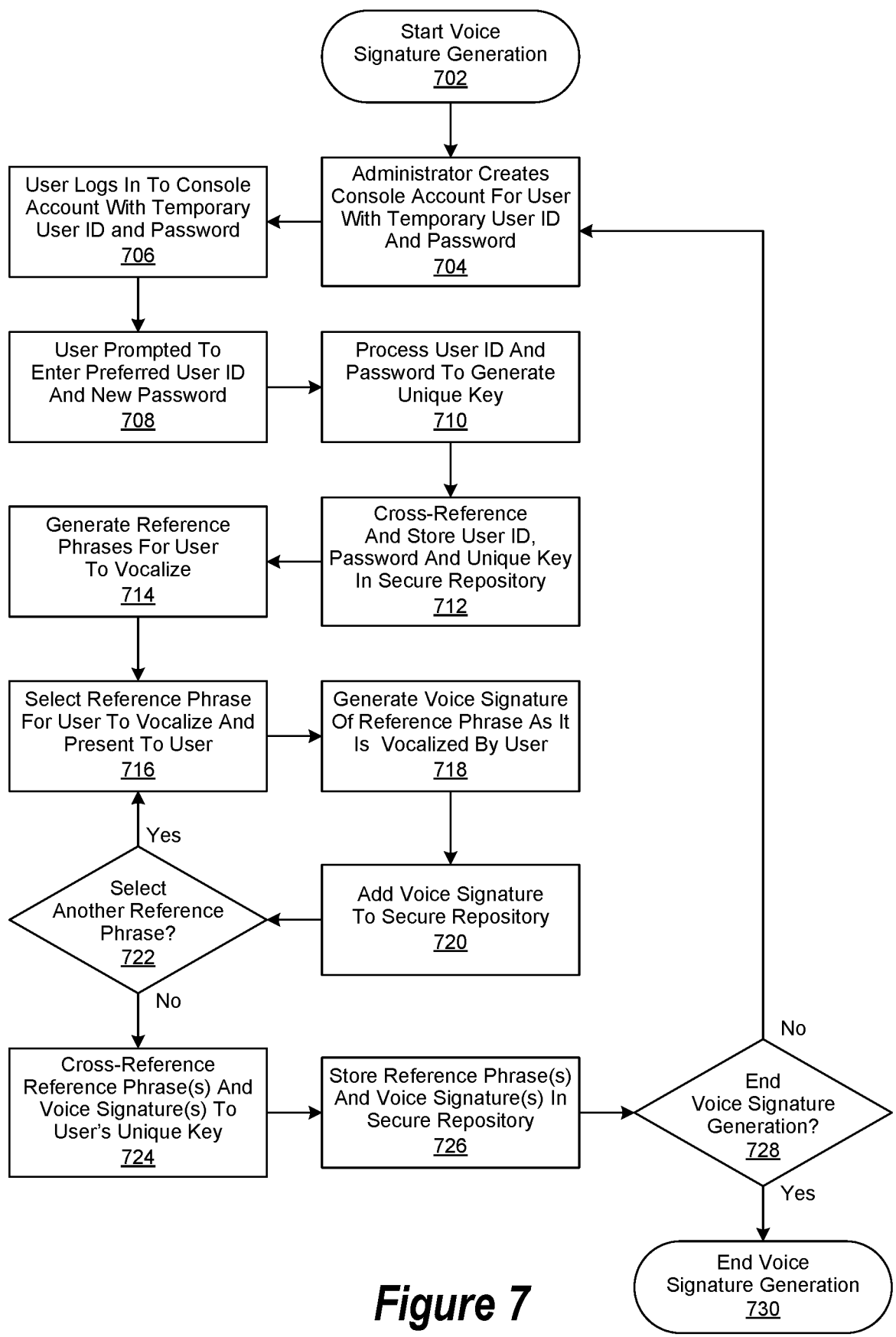
FIG. 7 is a flowchart showing the performance of user voice signature generation operations.

FIG. 7 is a flowchart showing the performance of user voice signature generation operations implemented in accordance with an embodiment of the invention. In this embodiment, voice signature generation operations are begun in step 702, followed by an administrator creating a data center monitoring and management console account with a temporary user identifier (User ID) and password for a target user in step 704. Thereafter, the target user uses the temporary User ID and password to log in to their data center monitoring and management console account in step 706, after which they are prompted to enter their preferred User ID and new password in step 708.

The User ID and password provided by the user is then processed in step 710 to generate a unique key. The resulting unique key, the user's User ID, and their password, are then cross-referenced to one another and stored in a secure repository, described in greater detail herein, in step 712. Reference words, or phrases, or a combination thereof, are then generated in step 714 for the user to recite. Then, in step 716, a reference word, or phrase, or a combination thereof, is selected and presented to the user to vocalize.

A voice signature of the selected reference word, or phrase, or a combination thereof, is then generated in step 718 as it is vocalized by the user. The resulting voice signature is then stored in a secure repository in step 720. A determination is then made in step 722 whether to select another reference word, phrase, or combination thereof, for presentation to the user. If so, the process is continued, proceeding with step 722. If not, then the resulting voice signature(s), and their associated reference words, phrases, or a combination thereof, are cross-referenced to the user's unique key in step 724, followed by being stored in a secure repository in step 726.

A determination is then made in step 728 whether to continue voice signature generation operations. If so, the process is continued, proceeding with step 704. Otherwise, voice signature generation operations are ended in step 730.

Figure 8:
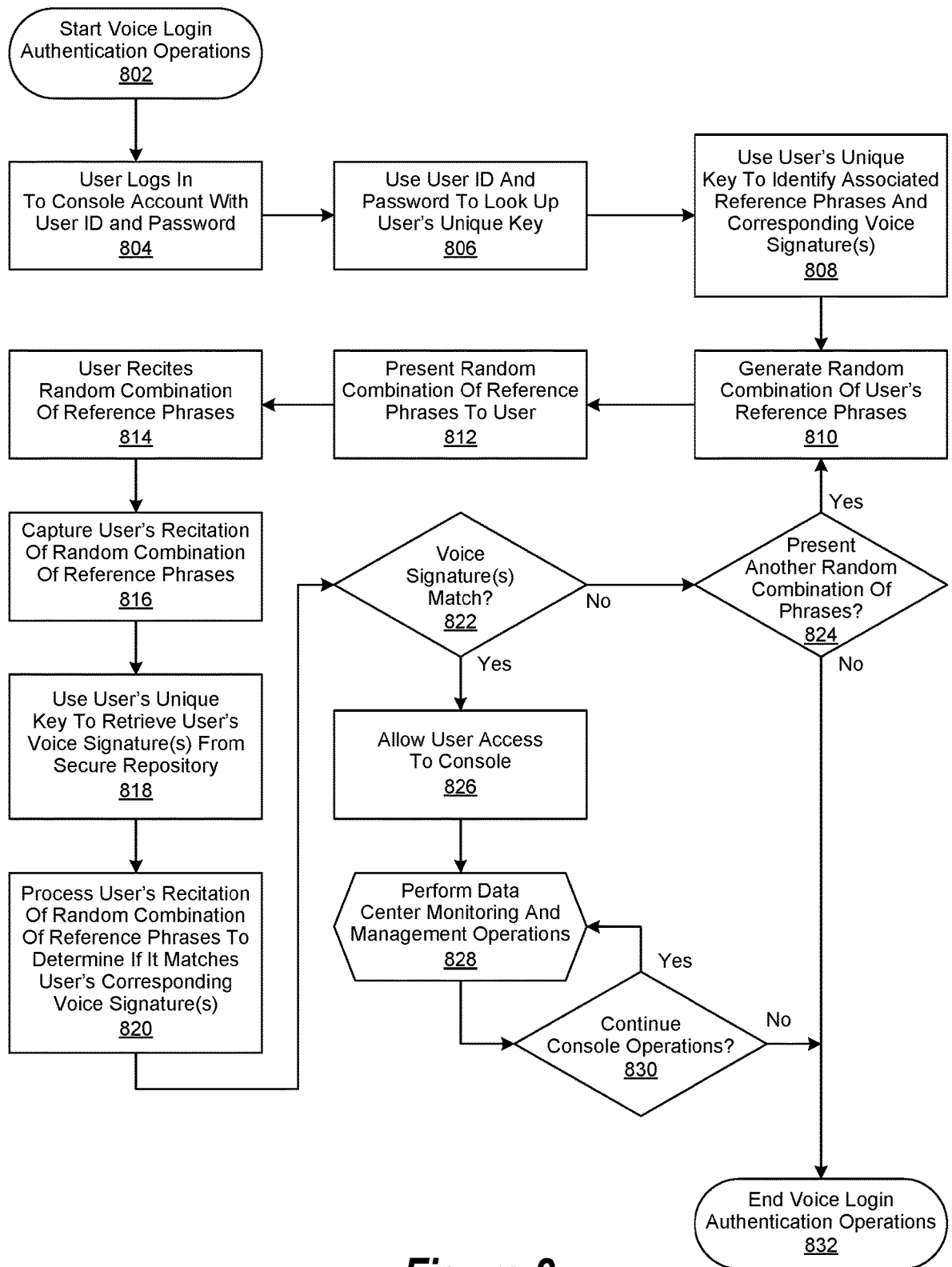
FIG. 8 is a flowchart showing the performance of voice login operations to authenticate a user.

FIG. 8 is a flowchart showing the performance of voice login operations implemented in accordance with an embodiment of the invention to authenticate a user. In this embodiment, voice login authentication operations are begun in step 802, followed by a user using their user identifier (User ID) and password in step 804 to log in to their data center monitoring and management console account. The User ID and password entered by the user in step 804 is then used in step 806 to look up the user's unique key, which once found, is used in step 808 to identify the user's associated reference words, phrases, or a combination thereof, and their corresponding voice signature(s), described in greater detail herein.

Once they are identified, a random combination of the user's associated reference words, phrases, or a combination thereof, is generated in step 810 and then presented to the user in step 812. The random combination of reference words, phrases, or a combination thereof, is recited by the user in step 814, with the recitation being captured in step 816. The user's unique key is then used in step 818 to retrieve the user's voice signature(s) corresponding the random combination of recited words, phrases, or combination thereof, from a secure repository, described in greater detail herein.

The user's recitation of the random combination of reference words, phrases, or combination thereof, is then processed in step 820 to determine if it matches the user's corresponding voice signature(s). A determination is then made in step 822 whether the user's recitation of the random combination of reference words, phrases, or combination thereof, matches the user's corresponding voice signature(s). If not, then a determination is made in step 824 whether to present another random combination of words, phrases, or a combination thereof. If so, then the process is continued, proceeding with step 810. Otherwise voice login authentication operations are ended in step 832.

However, if it was determined in step 822 that the user's recitation of the random combination of reference words, phrases, or combination thereof, matches the user's corresponding voice signature(s), then the user is allowed access to the data center monitoring and management console in step 826. Thereafter, ongoing data center monitoring and management console operations are performed in step 828, followed by a determination being made in step 830 whether to continue them. If so, then the process is continued, proceeding with step 828. Otherwise, voice login authentication operations are ended in step 832.

Figure 9:
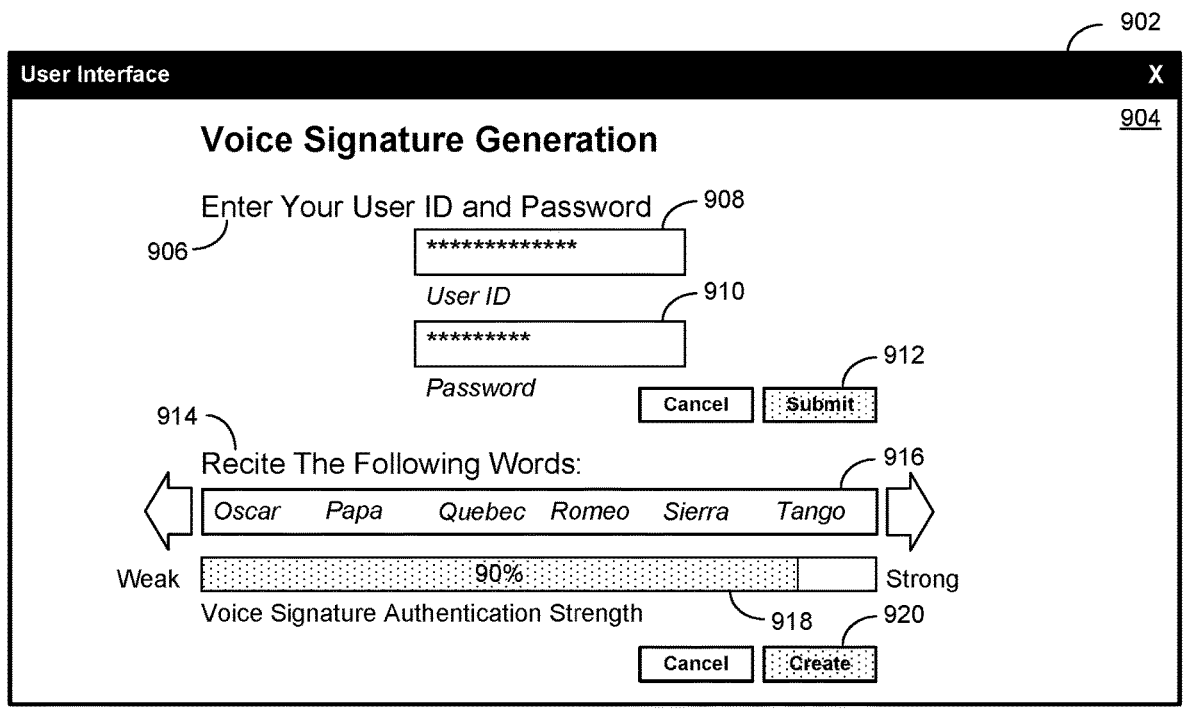
FIG. 9 shows an example screen presentation of a data center monitoring and management console user interface (UI) used to generate a voice signature for an associated user.

FIG. 9 shows an example screen presentation of a data center monitoring and management console user interface (UI) implemented in accordance with an embodiment of the invention to generate a voice signature for an associated user. In certain embodiments, a data center monitoring and management console may be implemented with a user interface (UI) 902, described in greater detail herein. In certain embodiments, the data center monitoring and management console UI 902 may be implemented to include a Voice Signature Generation window 904. In this embodiment, a user of a data center monitoring and management console is prompted to enter 906 their User ID and password into their corresponding data entry windows 908, 910. Once entered, the user is prompted to select a "Submit" 912 command button, which results in their User ID and password being submitted to the data center monitoring and management console.

Once the user's User ID and password have been received by the data center monitoring and management console, they are used to generate a unique cryptographic key, familiar to those of skill in the art, for the user. The resulting unique key, the user's User ID, and their password, are then cross-referenced to one another and stored in a secure repository, described in greater detail herein. The user's unique key is then retrieved from the secure repository and used to select certain reference words, or phrases, or a combination thereof 916, described in greater detail herein, which are then presented with an associated prompt 914 for the user to recite them.

The user then vocalizes, as likewise described in greater detail herein, the presented reference words, or phrases, or a combination thereof 916. As they do so, the user's unique key is used to begin generation of a voice signature of the selected reference word, or phrase, or a combination thereof, as it is vocalized by the user. In certain embodiments, as shown in FIG. 9, a progress bar 918 may be implemented to show the relative strength of the voice signature. Once the resulting voice signature is determined to be of sufficient strength, the user is prompted to select a "Create" 920 command button, which results in the voice signature being finalized and stored in a secure repository. Voice login authentication is then enabled for the user.

Figure 10:
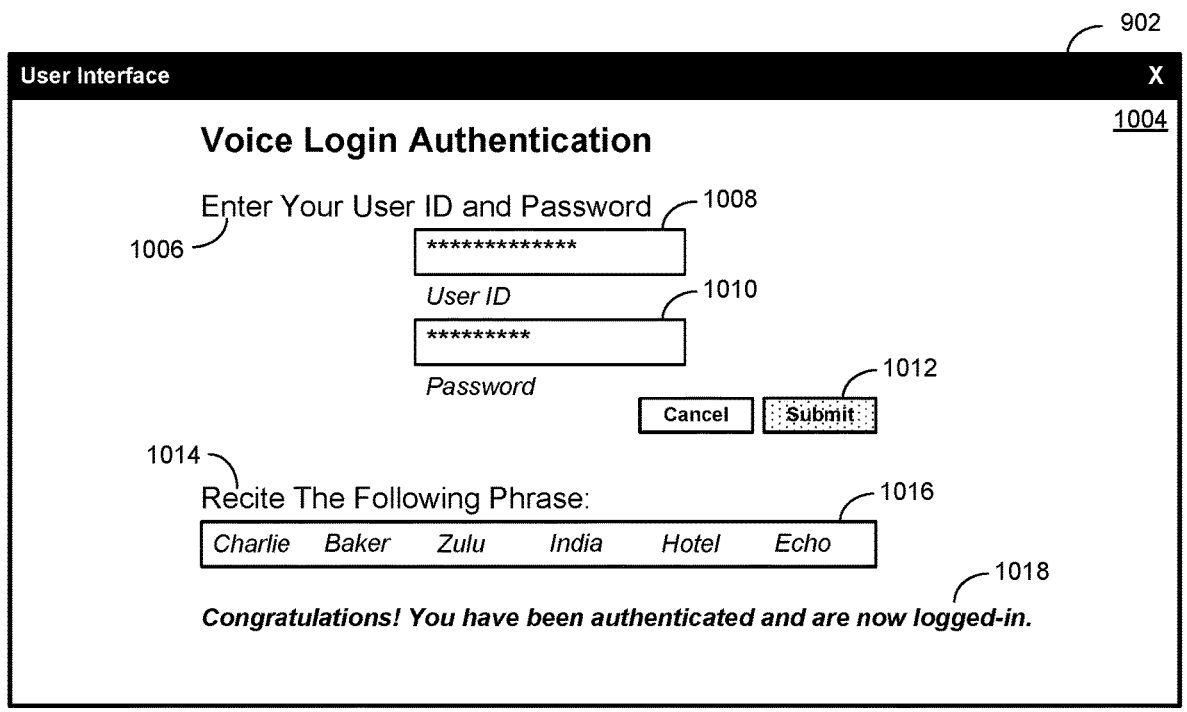
FIG. 10 shows an example screen presentation of a data center monitoring and management console UI used to authenticate a user's voice login with an associated voice signature.

FIG. 10 shows an example screen presentation of a data center monitoring and management console user interface (UI) implemented in accordance with an embodiment of the invention to authenticate a user's voice login with an associated voice signature. In certain embodiments, a data center monitoring and management console may be implemented with a user interface (UI) 902, described in greater detail herein. In certain embodiments, the data center monitoring and management console UI 902 may be implemented to include a Voice Login Authentication window 1004. In this embodiment, a user of a data center monitoring and management console is prompted to enter 1006 their User ID and password into their corresponding data entry windows 1008, 1010. Once entered, the user is prompted to select a "Submit" 1012 command button, which results in their User ID and password being submitted to the data center monitoring and management console.

Once the user's User ID and password have been received by the data center monitoring and management console, they are used to log in to their data center monitoring and management console account. The User ID and password entered by the user is then used to look up the user's unique key, which once found, is then used to retrieve the user's associated reference words, phrases, or a combination thereof, and their corresponding voice signature(s), described in greater detail herein, which are then presented with an associated prompt 1014. Once they are identified, a random combination of the user's associated reference words, phrases, or a combination thereof 1016, are retrieved and then presented 606 to the user.

The user then vocalizes, as likewise described in greater detail herein, the presented reference words, or phrases, or a combination thereof 1016. As they do so, the user's unique key is used to begin generation of voice signature(s) corresponding to the random combination of reference words, or phrases, or a combination thereof 1016, as they are vocalized by the user. The resulting voice signature(s) of the random combination of reference words, or phrases, or a combination thereof, are compared to the previously retrieved voice signature(s). If they match, then the user receives a notification 1018 that their voice login has been authenticated and they are allowed to access the data center monitoring and management console.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
    selecting a reference phrase;
    presenting the reference phrase to a user;
    generating a voice signature for the reference phrase when the reference phrase is vocalized by the user;
    storing the voice signature for the reference phrase within a data center monitoring and management console;
    instructing the user to recite a subset of words from the reference phrase, the subset of words comprising a combination of words of the reference phrase;
    granting access to the data center monitoring and management console when the subset of words match respective voice signatures stored within the data center monitoring and management console, the monitoring and management console including a monitoring module, a management module and a user interface engine, the monitoring module being implemented to monitor procurement, deployment, implementation, operation, management, maintenance, and remediation of a particular tangible data center asset at any point in a lifecycle of the particular tangible data center asset, the management module being implemented to manage the procurement, deployment, implementation, operation, monitoring, maintenance, and remediation of the particular tangible data center asset at any point in the lifecycle of the particular tangible data center asset, the user interface engine being implemented to generate a user interface for the provision, or receipt, of certain information associated with the monitoring, and management, of a particular tangible data center asset; and,
    allowing the user to perform the data center monitoring and management operation on the particular tangible data center asset contained within a data center upon grant of access to the data center monitoring and management console.

2. The method of claim 1, wherein:
the subset of words are randomly generated.

3. The method of claim 2, wherein:
access is granted as soon as a match is determined.

4. The method of claim 1, further comprising:
    creating a console account for the user with a temporary user identifier and password;
    logging in to the data center monitoring and management account using the temporary user identifier and password;
    generating a preferred user identifier and password; and,
    associating the preferred user identifier and password with the voice signature of the user.

5. The method of claim 1, wherein:
the reference phrase is presented via a voice signature generation user interface.

6. The method of claim 1, wherein:
the instructing the user is via a voice login authentication user interface.

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        selecting a reference phrase;
        presenting the reference phrase to a user;
        generating a voice signature for the reference phrase when the reference phrase is vocalized by the user;
        storing the voice signature for the reference phrase within a data center monitoring and management console;
        instructing the user to recite a subset of words from the reference phrase, the subset of words comprising a combination of words of the reference phrase;
        granting access to the data center monitoring and management console when the subset of words match respective voice signatures stored within the data center monitoring and management console, the monitoring and management console including a monitoring module, a management module and a user interface engine, the monitoring module being implemented to monitor procurement, deployment, implementation, operation, management, maintenance, and remediation of a particular tangible data center asset at any point in a lifecycle of the particular tangible data center asset, the management module being implemented to manage the procurement, deployment, implementation, operation, monitoring, maintenance, and remediation of the particular tangible data center asset at any point in the lifecycle of the particular tangible data center asset, the user interface engine being implemented to generate a user interface for the provision, or receipt, of certain information associated with the monitoring, and management, of a particular tangible data center asset; and,
        allowing the user to perform the data center monitoring and management operation on the particular tangible data center asset contained within a data center upon grant of access to the data center monitoring and management console.

8. The system of claim 7, wherein:
the subset of words are randomly generated.

9. The system of claim 8, wherein:
access is granted as soon as a match is determined.

10. The system of claim 7, wherein the instructions executable by the processor are further configured for:

creating a console account for the user with a temporary user identifier and password;
logging in to the data center monitoring and management account using the temporary user identifier and password;
generating a preferred user identifier and password; and,
associating the preferred user identifier and password with the voice signature of the user.

11. The system of claim 7, wherein:
the reference phrase is presented via a voice signature generation user interface.

12. The system of claim 7, wherein:
the instructing the user is via a voice login authentication user interface.

13. A non-transitory, computer-readable storage medium embodying computer program code, the computer program code comprising computer executable instructions configured for:
selecting a reference phrase;
presenting the reference phrase to a user;
generating a voice signature for the reference phrase when the reference phrase is vocalized by the user;
storing the voice signature for the reference phrase within a data center monitoring and management console;
instructing the user to recite a subset of words from the reference phrase, the subset of words comprising a combination of words of the reference phrase;
granting access to the data center monitoring and management console when the subset of words match respective voice signatures stored within the data center monitoring and management console, the monitoring and management console including a monitoring module, a management module and a user interface engine, the monitoring module being implemented to monitor procurement, deployment, implementation, operation, management, maintenance, and remediation of a particular tangible data center asset at any point in a lifecycle of the particular tangible data center asset, the management module being implemented to manage the procurement, deployment, implementation, operation, monitoring, maintenance, and remediation of the particular tangible data center asset at any point in the lifecycle of the particular tangible data center asset, the user interface engine being implemented to generate a user interface for the provision, or receipt, of certain information associated with the monitoring, and management, of a particular tangible data center asset; and,
allowing the user to perform the data center monitoring and management operation on the particular tangible data center asset contained within a data center upon grant of access to the data center monitoring and management console.

14. The non-transitory, computer-readable storage medium of claim 13, wherein:
the subset of words are randomly generated.

15. The non-transitory, computer-readable storage medium of claim 14, wherein:
access is granted as soon as a match is determined.

16. The non-transitory, computer-readable storage medium of claim 13, wherein the computer executable instructions are further configured for:
creating a console account for the user with a temporary user identifier and password;
logging in to the data center monitoring and management account using the temporary user identifier and password;
generating a preferred user identifier and password; and,
associating the preferred user identifier and password with the voice signature of the user.

17. The non-transitory, computer-readable storage medium of claim 13, wherein:
the reference phrase is presented via a voice signature generation user interface.

18. The non-transitory, computer-readable storage medium of claim 13, wherein:
the instructing the user is via a voice login authentication user interface.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

\* \* \* \* \*